Patented Aug. 7, 1934

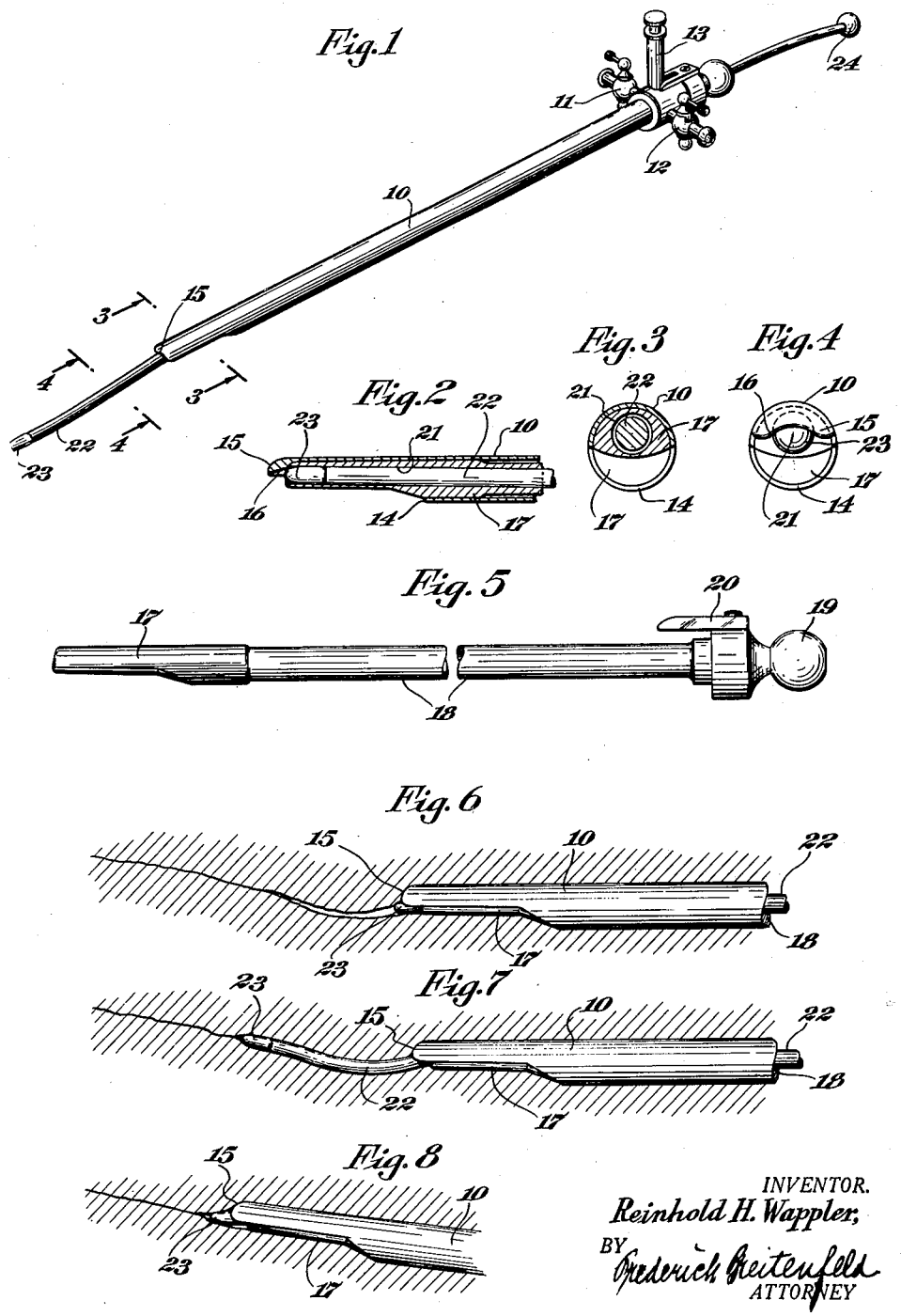

1,969,342

UNITED STATES PATENT OFFICE 1,969,342

FENESTRATED ENDOSCOPIC INSTRUMENT AND OBTURATOR THEREFOR

Reinhold H. Wappler, Yonkers, N. Y.; Frederick C. Wappler administrator of said Reinhold H. Wappler, deceased Application December 19, 1931, Serial No. 582,050

4 Claims. (Cl. 128—7)

My present invention relates generally to surgical instruments, and has particular reference to a fenestrated endoscopic instrument and a novel form of obturator therefor.

A general object of my invention is to provide an improved endoscopic instrument which is adapted to be inserted into a body cavity with enhanced facility.

A more particular object of my invention lies in providing an instrument which may be more efficiently and expeditiously inserted into a constricted type of body cavity.

In the employment of surgical or diagnostic instruments of this general character, an outer endoscopic tube is usually inserted into the body cavity as a preliminary step prior to the insertion, through such tube, of the diagnostic or operative instruments themselves. Because of the danger of injury to the walls of the cavity, and also to facilitate insertion of the endoscopic tube, it is customary to employ an obturator which plugs the fenestra or fenestrae of the outer endoscopic tube during the process of insertion. Where an obturator is used, the simultaneous employment of a telescope or the like is obviously precluded, so that the insertion is necessarily accomplished "in the dark", the instrument being properly inserted chiefly by "feel", assisted, of course, by the inherent knowledge of the operator of the characteristics of the particular cavity that is involved.

Most body cavities are not straight, and the constricted cavities, in particular, are frequently found to deviate in a variety of ways from a normal or anticipated direction. The very fact that a diagnosis or operation is necessitated usually indicates that a condition other than normal exists, either by virtue of an unusual twist or constriction or because of a growth, protrusion, swelling, or the like.

It is a particular object of my present invention to provide a fenestrated endoscopic instrument, and a specially constructed obturator therefor, whose proper and efficient insertion into a constricted cavity is greatly simplified and rendered capable of accomplishment in the shortest possible time and with the least possible likelihood of needless pain or injury.

Briefly, my invention is characterized by an arrangement whereby a flexible probe or "feeler" may be conveniently caused to project forwardly from an otherwise effectively obturated endoscopic tube, as occasion may require. A flexible probe rapidly and automatically finds its own way through the channel or passage into which the instrument is to be inserted, and serves as a sort of antenna which may be used to guide the subsequent advancing movement of the instrument itself. The construction is such that the probe may be projected forwardly from the instrument by varying degrees whenever the normal insertion appears to be impeded; and after the probe has been advanced the instrument may be caused to follow after the probe, at which time the procedure may be repeated.

One of the main features of my invention lies in the provision of an obturator which has a longitudinal passage for a flexible probe of the character mentioned.

I achieve the foregoing objects and advantages, and such other objects and advantages as may hereinafter appear or be pointed out, in the manner illustratively exemplified in the accompanying drawing, wherein—

Figure 1 is a perspective view of a typical form of endoscopic instrument embodying the features of my present invention;

Figure 2 is an enlarged longitudinal cross-sectional view of the forward end of the instrument;

Figure 3 is an enlarged cross-sectional view taken substantially along the line 3—3 of Figure 1;

Figure 4 is an end view taken substantially along the direction 4—4 of Figure 1, the probe being omitted;

Figure 5 is a side view of the obturator, by itself; and

Figures 6, 7, and 8 are side views of the instrument during its insertion into a body cavity, showing its manner of employment.

The tube 10 of Figure 1 has been shown, for illustrative purposes, provided with the petcocks 11 and 12 at the rear end, together with a post 13 which facilitates the insertion of the obturator and/or other diagnostic or operative instruments subsequently to be inserted through the endoscopic tube 10. I have shown the tube 10 provided with an obliquely forward fenestra at its forward end. The rear edge 14 of this fenestra is shown most clearly in Figure 2. The tube wall opposite the edge 14 is obviously longer than the opposite wall, and it is preferably caused to terminate in a rounded or blunted forward edge or portion 15. A small longitudinal groove or passage 16 is provided in this blunted edge or portion.

The obturator of my present invention is shown most clearly in Figure 5. A head 17 is configured in such a way that it will efficiently plug the fenestra of the tube 10, the exposed surfaces of the head being shaped and contoured so as to form substantially smooth continuations of the surfaces of the tube 10, whereby the several exposed edges of the fenestra, such as the head 14, will be rendered harmless.

The head 17 is mounted upon a shank 18 which terminates at its rear end in any suitable form of knob or handle 19. A bifurcated member 20 is preferably, though not necessarily, provided at the rear end of the shank for engagement with the post 13 when the obturator is in full inserted position, as indicated in Figure 1.

In accordance with my invention, the head 17 and the shank 18 are provided with a continuous longitudinal passage 21 which I have shown in the form of a longitudinal bore of substantially uniform diameter throughout, this passage or bore being adapted to permit a flexible probe to be projected therethrough. The forward end of the passage 21 is so positioned that when the obturator is fully inserted, it will be in substantial alignment with the groove 16.

Although any type of flexible probe or the like may be employed, I have shown a member 22 which is provided at its forward end with a smooth metallic head 23 and which has a handle 24 at its rear end. The probe is preferably of a character which will fit snugly yet slidably in the longitudinal passage hereinbefore mentioned.

When the instrument is used, the obturator is inserted to its full extent and the probe is positioned therein in substantially the relationship shown in Figures 2 and 6. The instrument is then inserted into a body cavity, as indicated in Figure 6. Whenever the operator finds it desirable to do so, he momentarily holds the tube 10 stationary and advances the probe 22, as indicated in Figure 7. Regardless of the nature of the cavity, or of the constriction or twisting thereof, the probe will automatically thread its way through the cavity with great facility, thus "blazing the trail", as it were, for the instrument itself. After the desired projection of the probe has been effected, the instrument is slid forwardly over the probe, as a result of which it will be expeditiously advanced further into the cavity, as indicated in Figure 8. At this stage, the procedure may be repeated, if desired. When the full desired insertion of the instrument has been effected, the obturator and the probe are withdrawn, and the endoscopic tube 10 is then ready to receive such other diagnostic or operative instrumentalities as may be necessary or desirable.

It will be understood that I do not mean to restrict myself to any particular configuration of obturator head or to any particular type of endoscopic tube or fenestra.

In general, it will be understood that changes in the details herein described and illustrated for the purpose of explaining the nature of my invention may be made by those skilled in the art without departing from the spirit and scope of the invention as expressed in the appended claims. It is therefore intended that these details be interpreted as illustrative, and not in a limiting sense.

Having thus described my invention, and illustrated its use, what I claim as new and desire to secure by Letters Patent is—

1. The combination with an endoscopic tube having a fenestra at its forward end, of an obturator comprising a shank insertable into said tube and provided with a head at its forward end, said head being blunted and adapted to plug said fenestra, and said shank and head being provided with a continuous longitudinal bore through which a flexible feeler probe may be passed.

2. In an instrument of the character described, an endoscopic tube having an obliquely forward fenestra at its forward end, the long wall portion of the endoscopic tube terminating in a blunted edge, and an obturator provided with a head adapted to plug said fenestra, said head being provided with a longitudinal passage for a flexible probe, the forward end of said passage lying adjacent to said blunted edge.

3. In an instrument of the character described, an endoscopic tube having an obliquely forward fenestra at its forward end, the long wall portion of the endoscopic tube terminating in a blunted portion having a longitudinal passage, and an obturator comprising a longitudinally bored shank and a head adapted to plug said fenestra, said head being provided with a longitudinal passage merging at the rear with the bore in the shank and aligned at the front with the passage in said blunted portion, whereby a flexible probe may be projected from the forward end of the instrument when said fenestra is effectively obturated.

4. The combination with an endoscopic tube having a fenestra at its forward end, of an obturator comprising a shank insertable into said tube and provided with a head at its forward end, said head being blunted so as to plug said fenestra when the obturator is in position, and said head being provided with a longitudinal bore through which a flexible feeler probe may be projected forwardly of the obturated instrument.

REINHOLD H. WAPPLER.